United States Patent [19]

Bartlett

[11] 4,278,926
[45] Jul. 14, 1981

[54] STEP MOTOR CIRCUIT

[75] Inventor: Peter G. Bartlett, Davenport, Iowa

[73] Assignee: Automation Systems, Inc., Eldridge, Iowa

[21] Appl. No.: 41,719

[22] Filed: May 23, 1979

[51] Int. Cl.³ .............................................. G05B 19/40
[52] U.S. Cl. .................................... 318/696; 318/138
[58] Field of Search ................ 318/696, 685, 138, 254

[56] References Cited

U.S. PATENT DOCUMENTS

| | | | |
|---|---|---|---|
| 3,573,593 | 4/1971 | Beery | 318/696 |
| 4,121,144 | 10/1978 | Leenhouts | 318/696 |
| 4,127,801 | 11/1978 | Leenhouts | 318/696 |
| 4,140,955 | 2/1979 | Drabing | 318/696 |

*Primary Examiner*—B. Dobeck

[57] ABSTRACT

A circuit which effectively prevents voltage spikes caused by leakage inductance of the step motor windings without otherwise interfering with the overall operation of the step motor. The circuit incorporates two windings between a common point and the positive supply and two other windings between the common point and the negative supply. Voltage spikes are suppressed by diodes connecting directly from the ends of each of the windings to the supply terminals oriented to the opposite end of the respective windings.

7 Claims, 1 Drawing Figure

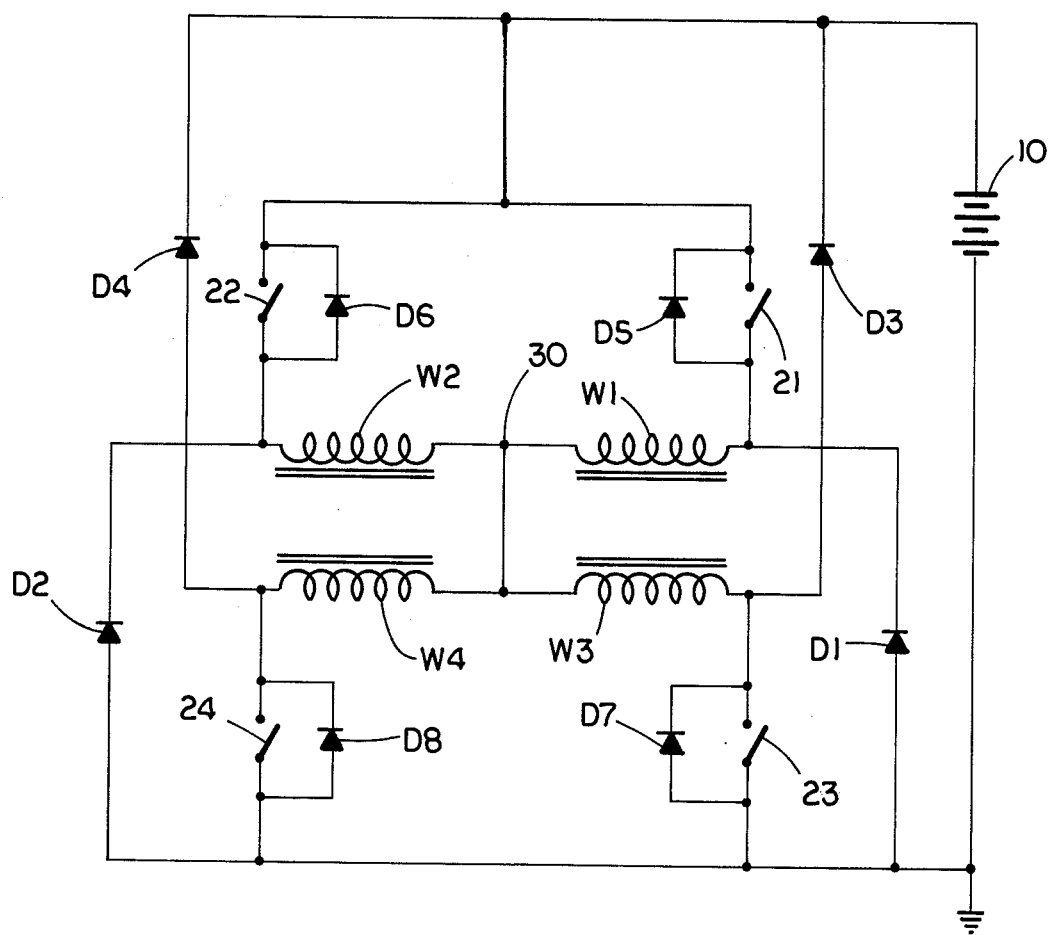

STEP MOTOR CIRCUIT

BACKGROUND OF THE INVENTION

1. Field of the Invention

The field of the invention is step motor circuits and more particularly those circuits which include means for preventing voltage spikes which tend to occur at the ends of the step motor windings.

2. Description of the Prior Art

In the normal operation of a step motor circuit voltage spikes periodically occur at the end of the step motor windings. These voltage spikes are caused by the leakage inductance through a winding when an associated contact switch is instantaneously opened. These leakage inductance spikes tend to damage the operating switches (usually transistors). To minimize damage, more expensive, high-voltage-tolerant components are required. Further, these spikes interfere generally with the overall operation of the motor, and their dissipation generates substantial heat loss which results in wasted power consumption.

Leenhouts U.S. Pat. No. 4,121,144 discloses a step motor cicruit which utilizes an RC circuit to partially solve the leakage inductance problem. The RC circuit is used as a source of current to prevent the voltage spikes from reaching undesirable proportions. In Leenhouts the current path used to "drain" the voltage spikes flows through the RC circuit, the winding, a diode and a second switch which is closed. Although Leenhouts does partially solve the despiking problem, additional problems are created in that (1) the RC circuit itself interferes with the overall operation of the switching transistors; (2) heat loss in the resistor of the RC circuit is power inefficient, and (3) because the RC circuit does not react instantaneously, the voltage spikes are not completely maintained within the voltage limits of the circuit components.

SUMMARY OF THE INVENTION

In general terms the present invention is a highly energy efficient step motor circuit that solves the voltage spiking problem caused by leakage inductance without interfering with the normal operation of the step motor circuit. This is accomplished by an arrangement of diodes which connect the ends of the various step motor windings with the appropriate terminals of the power source. The diodes are arranged in such a manner so as to provide a despiking current path which does not flow through resistors or closed switch circuitry and therefore does not waste power and does not interfere with the overall operation of the circuit. The present invention has the further advantage in that the despiking current path has the effect of recharging the power source thus increasing the power efficiency of the circuit.

It is therefore an object of the present invention to provide a step motor circuit which solves the leakage inductance problem common to step motor circuits without interfering with the normal operation of the circuit.

It is a further object to provide such a circuit which is energy efficient.

These and other objects and advantages of the present invention will become more apparent in the following FIGURE and detailed description.

BRIEF DESCRIPTION OF THE DRAWING

The drawing is a circuit diagram of a preferred embodiment of the present invention.

DETAILED DESCRIPTION OF THE PREFERRED EMBODIMENT

Referring to the drawing, each of windings W1, W2, W3 and W4 has a first end connected to the other windings at a common electrical point 30. Diodes D1 and D2 connect between the second ends of windings W1 and W2, respectively and the ground terminal of battery 10. The anodes of diodes D1 and D2 are connected to the ground terminal. Diodes D3 and D4 connect between the second ends of windings W3 and W4, respectively and the positive voltage terminal of battery 10. The cathodes of diodes D3 and D4 are connected to the positive voltage terminal.

The second end of winding W1 is also switchably connected to the positive voltage terminal of battery 10 through switch means 21. A diode D5 is connected across switch means 21 with the anode of diode D5 being connected to winding W1. Likewise the second end of winding W2 is switchably connected to the positive voltage terminal of battery 10 through switch means 22. A diode D6 is connected across switch means 22 with the anode of diode D6 being connected to winding W2.

The second end of winding W3 is switchably connected to the ground terminal of battery 10 through switch means 23. A diode D7 is connected across switch means 23 with the cathode of diode D7 being connected to winding W3. Likewise the second end of the winding W4 is switchably connected to the ground terminal of battery 10 through switch means 24. A diode D8 is connected across switch means 24 with the cathode of diode D8 being connected to winding W4.

In the preferred embodiment, the switching signals to switch means 21-24 incorporate variable frequency direct current pulses with each pulse having a constant pulse width of one millisecond. This current control is accomplished directly by switch means 21-24, without using an additional series current control device. Current control could also be achieved with switching signals having pulse width modulation. In some applications a series current control device could be more desirable. A less sophisticated version of the present invention will also operate without pulsation of the current.

In operation, switch means 21-24 control the path of current flowing through windings W1-4. Various combinations of switch means 21-24 are sequentially timed to open and close. With each subsequent combination of open and closed switches the resulting current paths through windings W1-4 inductively advance the step motor. While sequencing may be as disclosed in the Leenhouts patent, a half step mode may also be used by closing sequentially various combinations of three switch means.

A leakage inductance problem occurs whenever one of the switch means 21-24 instantaneously changes from a closed state to an open state. For example, when this occurs at switch means 21, the inherent inductance of winding W1 attempts to continue to draw current, resulting in a negative spike at the end of winding W1 connecting with the opened switch 21. There are several disadvantages related to this voltage spike. The voltage spike tends to damage the switch (typically a transistor). In some circuits the continued current flow through the winding works against the efficient operation of the step motor. Additionally, the voltage spike may drain through a circuit path which runs through a resistor or other resistive component, causing heat loss and therefore resulting in wasted power.

The Leenhouts circuit attempted to deal with the voltage spike problem by utilizing an RC circuit. The despiking current path in the Leenhouts circuit theoretically passes through the RC combination, a winding, a diode and a second switch (which is supposed to be closed during the time in which the other switch is open) back to the RC combination. This circuit does have a despiking effect if everything works perfectly, however there are several disadvantages with this particular circuit: (1) the RC circuit does not respond instantaneously to a voltage spike thus allowing some measure of a voltage spike in any event; (2) the despiking current path flows through the resistor of the RC circuit causing heat loss which results in wasted power; (3) the despiking current path flows through one of the switching means and therefore the overall switching operation of the step motor circuit is affected; (4) if the sequence of opening and closing of the switches is incorrect, there may be no non-destructive current path available.

In the preferred embodiment, the negative voltage spike which tends to occur at the point between winding W1 and switch means 21 when switch means 21 is instantaneously opened is prevented by diode D1. Diode D1 draws current from the negative voltage terminal of battery 10 instantaneously when winding W1 continues to draw current after switch means 21 has been opened. Thus the voltage at the point between winding W1 and switch mean 21 does not fall below the voltage differential of D1 (about 0.7 volts) less than the negative terminal of batter 10 (ground). Further the despiking current path flows solely through a combination of diodes D1-4, windings W1-4 and battery 10. The actual current path will vary depending upon the direction of current flow through the windings at the time of the attempted voltage spike. These current paths do not include a resistor or other power consumptive component (except windings W1-4). High voltages do not appear across the switch means 21-24.

One example of such despiking current path is through winding W1, winding W3, diode D3, through battery 10 (charging it), and through diode D1 back to winding W1. In the actual circuit some of the despiking current flow may flow through one of the closed switch means (in the given example switch means 23 for instance); however, the arrangement of the diodes effectively prevents a voltage drop across any of the switch means 21-24 greater than the voltage drop of battery 10 (plus the approximately 0.7 volt drop across the diodes). This is because diode D3 despikes an increase in voltage at the point between winding W3 and switch means 23 in the same manner as diode D1 despikes the point between winding W1 and switch means 21.

In the preferred embodiment windings W1 and W2 are substantially identical sub-windings which together form a first bifilar winding. Likewise windings W3 and W4 together form a second bifilar winding which is substantially identical to the first bifilar winding. As a result of this arrangement, there is a transformer coupling action between the subwindings of each bifilar winding. This series arrangement of the matched windings tends to cause the voltage at electrical point 30 to be maintained at about midway between the positive and the negative voltage of battery 10 while current is flowing through a combination of windings W1-W4. Also, the transformer action tends to produce a voltage at the external end of each temporarily dormant sub-windings equal to either the positive voltage or the negative voltage of battery 10. For instance if current is flowing through windings W1 and W3, then the transformer action tends to produce a voltage at the external end of winding W2 equal to ground and at the external end of winding W4 equal to the positive voltage of battery 10.

Any leakage inductance occurring in the circuit tends to cause the voltage at the external ends of windings W1-W4 to either increase above the positive of voltage battery 10 (for windings W3 and W4) or to decrease the voltage to less than ground (for windings W1 and W2). However, the arrangement of diodes D1-D4 effectively prevent a voltage transient from occurring to any extent greater than the 0.7 voltage drop across these diodes. In this manner the circuit of the present invention effectively prevents virtually any harmful result from leakage inductance occuring upon pulsed operation of a particular combination of windings or upon a change in the combination of operating windings.

Certain types of voltage transients are also suppressed by diodes D5, D6, D7 and D8.

Utilizing a pulse current increases the overall efficiency of the circuit of the present invention. The frequency of the pulses may be adjusted to provide just the needed amount of power to deal with either a stationary mode or a high speed mode. This avoids over heating of the motor in one mode while operating under capacity in another mode. In this manner the circuit tends to make the maximum use of this current and is therefore extremely power efficient.

While there have been described above the principles of this invention in connection with specific apparatus, it is to be clearly understood that this description is made only by way of example and not as a limitation to the scope of the invention.

What is claimed is:

1. A step motor circuit comprising: p1 (a) a power source, having a first voltage terminal and a second, more positive, voltage terminal;

(b) first, second, third, and fourth switch means;

(c) first, second, third, and fourth step motor windings, each of said windings having one end connecting to the other said windings; the other ends of said first and second windings being switchably connected to said second voltage terminal through said first and second switch means respectively; the other ends of said third and fourth windings being switchably connected to said first voltage terminal through said third and fourth switch means;

(d) a first diode and a second diode, said diodes connecting the other ends of said first and said second windings with said first voltage terminal respectively; the anodes of said diodes being connected to said first voltage terminal;

(e) a third diode and a fourth diode, said diodes connecting the other ends of said third winding and said fourth winding with said second voltage terminal respectively; the cathodes said diodes being connected to said second voltage terminal.

2. The step motor circuit of claim 1 in which said windings are directly connected to each other forming a common electrical point.

3. The step motor circuit of claim 2 additionally comprising a fifth, sixth, seventh, and eighth diode and in which said fifth, sixth, seventh, and eighth diodes connect across said first, second, third, and fourth switch means respectively; the anodes of said fifth and sixth diodes being connected to said first and second windings respectively, and the cathodes of said seventh and eighth diodes being connected to said third and fourth windings respectively.

4. A step motor circuit comprising:
(a) a step motor having first and second substantially identical transformer coupled sub-windings, the first ends of said subwindings being connected to each other at a first electrical point;
(b) first and second switch means for switchably connecting the second ends of said first and second sub-windings respectively to a second electrical point;
(c) a third electrical point;
(d) means for causing the voltage at said first electrical point to be about midway between the voltages at said said second electrical point and said third electrical point while current is flowing through a coil selected from the group consisting of said first and second subwindings; and
(e) first and second diodes connecting the second ends of said first and second sub-windings respectively to a third electrical point; said diodes being oriented such that when said switch means are closed, the flow of current between said second electrical point and said third electrical point through said diodes is prevented.

5. The step motor of claim 4 which additionally includes means for regulating the voltage at said third electrical point.

6. The step motor circuit of claim 4 additionally comprising:
(e) a second step motor winding which is substantially identical to said first step motor winding, said second winding having third and fourth substantially identical transformer coupled subwindings, the first ends of said third and fourth sub-windings being connected to each other at said first electrical point;
(f) third and fourth switch means for switchably connecting the second ends of said third and fourth sub-windings respectively to said third electrical point; and
(g) third and fourth diodes connecting the second ends of said third and fourth sub-windings respectively to said second electrical point; said diodes being oriented such that when said third and fourth switch means are closed, the flow of current between said second electrical point and said third electrical point through said diodes is prevented.

7. The step motor of claim 4 in which the subwindings are bifilar.

* * * * *